United States Patent

[11] 3,539,194

[72] Inventor: Tony W. Stiles
Box 436, Golden City, Missouri 64748
[21] Appl. No.: 755,594
[22] Filed: Aug. 27, 1968
[45] Patented: Nov. 10, 1970

[54] DUFFELBAG CARRIER
3 Claims, 7 Drawing Figs.

[52] U.S. Cl. ................................................ 280/47.13
[51] Int. Cl. ................................................ B62b 1/06
[50] Field of Search .................................. 280/47.13, 47.26; 214/374

[56] References Cited
UNITED STATES PATENTS
3,272,529  9/1966  Rachman ............ 280/47.13

FOREIGN PATENTS
76,260   12/1947  Czechoslovakia ............ 280/47.13
674,857  6/1952   Great Britain ............... 280/47.13
1,004,982 12/1951 France ........................ 214/374

Primary Examiner—Banjamin Hersh
Assistant Examiner—John A. Pekar
Attorney—John A. Hamilton ABSTRACT: A duffelbag carrier consisting of a beam having a floor-engaging wheel at each end thereof extending laterally thereof and rotatable on an axis longitudinal thereto, a tongue pivoted to said beam intermediate the ends of the latter and movable from a position lying along said beam to a position extending laterally therefrom, and a pair of straps associated respectively with said beam and said tongue and operable to secure said members to a duffelbag or other article to be carried.

Patented Nov. 10, 1970

3,539,194

INVENTOR.
Tony W. Stiles
BY John A. Hamilton
Attorney.

DUFFELBAG CARRIER

SPECIFICATION

This invention relates to new and useful improvements in devices for assisting and facilitating the manual transportation of articles too heavy and cumbersome to be carried long distances without undue fatigue. While the device has been conceived and developed primarily for use in connection with the duffelbags commonly used by military servicemen for carrying uniforms, equipment and personal effects, it will be readily apparent that the device is equally well-adapted for use in connection with suitcases, trunks, boxes, crates and nearly any other rigid or semirigid articles of generally comparable size.

The principal object of the present invention is the provision of a carrier of the character described which, while fully adequate for carrying even quite heavy objects, is nevertheless quite small and compact, to the end that it may be conveniently stored when not in use, for example in the duffelbag or other object it normally carries. To this end, the carrier consists primarily of a small carriage large enough only to mount a pair of floor-engaging wheels, and means for attaching said carriage to a duffelbag or the like, whereby the duffelbag may be wheeled along the floor in the manner of a two-wheeled cart, with the duffelbag itself serving as the body of the "cart."

Another object is the provision of a carrier of the character described wherein the carriage is foldable or collapsible from its use position to occupy a still smaller space for still greater convenience of storage, and wherein the carriage is maintained in its extended or use position by its attachment to the duffelbag.

Other objects are simplicity and economy of construction, efficiency and dependability of operation, and adaptability for use in a wide variety of applications.

With these objects in view, as well as other objects which will appear in the course of the specification, reference will be had to the accompanying drawing, wherein:

FIG. 7 is an enlarged, fragmentary view similar to FIG. 1, showing use of the carrier in connection with a box, crate or the like.

Figure 1:
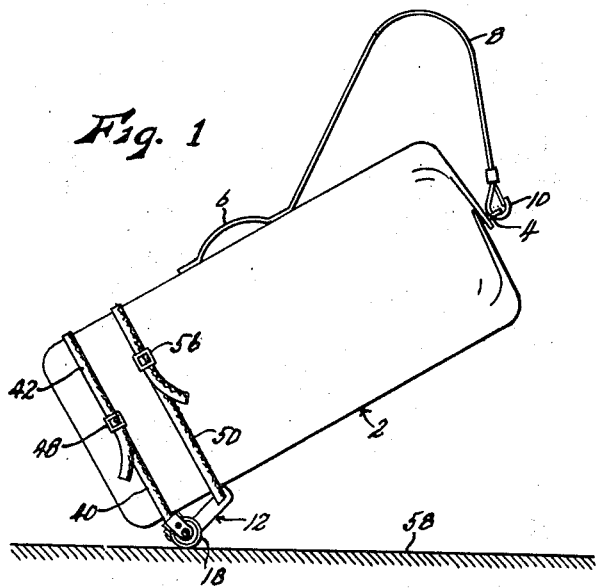
FIG. 1 is a side elevational view of a duffelbag carrier embodying the present invention, shown operatively mounted on a duffelbag.

Like reference numerals apply to similar parts throughout the several views, and the numeral 2 applies generally to a duffelbag to be carried, said duffelbag being most commonly formed of a canvas or the like, being elongated with a rounded rectangular cross-sectional contour and being openable at one end being securable in a closed position by a hasp 4 secured to the bag at its mouth and insertable through grommets, not shown, fixed in mouth of the bag at points other than that to which the hasp is secured. The bag is provided intermediate its ends with a strap-carrying handle 6, the strap forming said handle being extended to form a shoulder-carrying strap 8 having at its free end a snap hook 10 adapted to be engaged in hasp 4.

Figure 4:
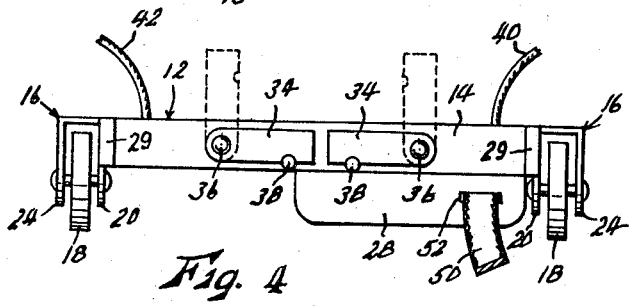
FIG. 4 is a rear elevational view of the carrier as shown in FIGS. 2 and 3, with the tongue folded to its storage position, and with the backstops shown folded in storage position in solid lines and extended to their use position in dotted lines.
Figure 3:
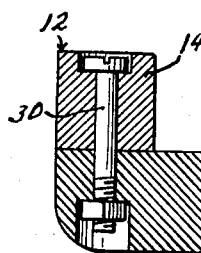
FIG. 3 is a side elevational view of the carrier as shown in FIG. 2.
Figure 5:
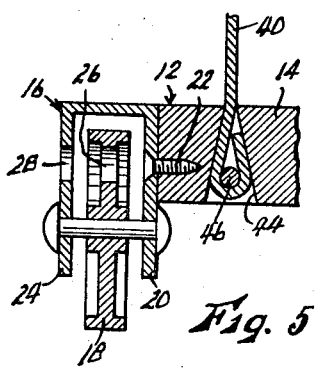
FIG. 5 is an enlarged, fragmentary sectional view taken on line V-V of FIG. 2.
Figure 6:
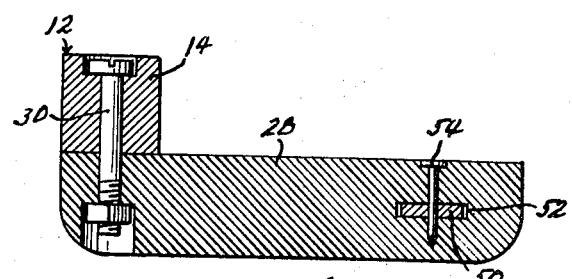
FIG. 6 is an enlarged sectional view taken on line VI-VI of FIG. 2.

The carrier device forming the subject matter of the present invention is indicated generally by the numeral 12, and is shown in detail in FIGS. 2—6. It includes a horizontal beam 14 extending transversely to the direction of travel of the carrier, and which may be formed of wood, metal or other suitable material. Affixed to each end of said beam is a bracket 16 of inverted U-shape, in which is rotatably mounted one floor-engaging wheel 18. Said wheels are coaxial, and their axis is parallel to beam 14. As best shown in FIG. 5, the inner leg 20 of each bracket is affixed to the contiguous end of beam 14 by a screw 22, and wheel 18 and the outer leg 24 of the bracket are provided respectively with holes 26 and 28 which may be brought into registry by turning the wheel, in order to provide access to said screw. Inner leg 20 of the bracket is provided with ears 29 folded along the sides of the beam to prevent rotation of the bracket on screw 22.

Figure 2:
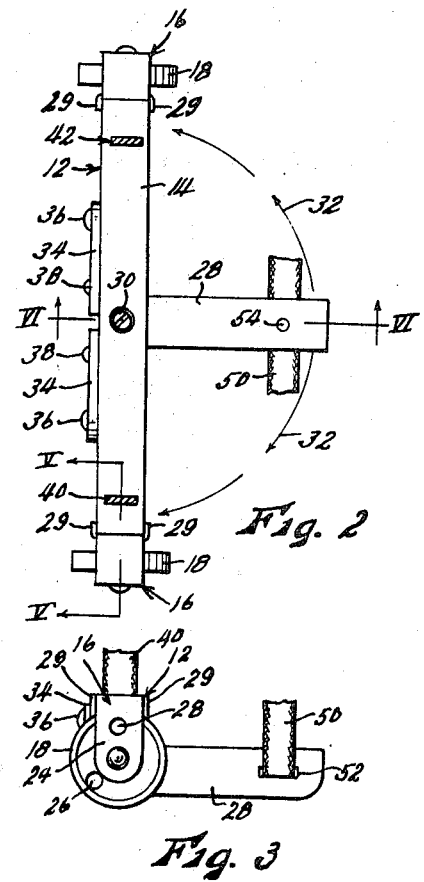
FIG. 2 is an enlarged top plan view of the carrier as shown in FIG. 1, with parts broken away.

A tongue 28 has one end thereof pivoted to the midpoint of beam 14, by means of a pivot bolt 30 extending at right to the axis of wheels 18. Said tongue in use normally extends forwardly from beam 14 as shown in FIG. 2, but may be pivoted in either direction as indicated by arrows 32 to lie directly beneath the beam, as shown in FIG. 4. A pair of backstop bars 34 are carried by beam 14 intermediate its ends, each bar being pivoted to the forward side of said beam, as at 36, for movement from a storage position coincident with beam 14 as shown in solid lines in FIG. 4, to an upright position projection above said beam, as shown in dotted lines. Their downward pivotal movement is limited by stop screws 38 threaded into beam 14.

A pair of straps 40 and 42 are secured to beam 14, respectively adjacent opposite ends thereof, and project upwardly therefrom. As best shown in FIG. 5, each strap is secured in the beam by inserting an end thereof downwardly into an upwardly tapered slot 44, folding it about a free pin 46 in said slot, and pulling upwardly on the strap to wedge the pin and strap tightly in slot 44. In use, these straps, which are formed of textile fabric or the like and are pliable, are trained oppositely around duffelbag 2 and their ends joined by any suitable means such as buckle 48 (see FIG. 1). Another strap 50 is inserted through a hole 52 formed transversely in tongue 28 adjacent the free end of the latter. Said strap may be free-running in said hole, but is preferably secured therein, as by a nail 54 driven through said tongue. In use, the ends of strap 50 are also trained oppositely around duffelbag 2, and secured together as by a nail 54 driven through said tongue. In use, the ends of strap 50 are also trained oppositely around duffelbag 2, and secured together as by buckle 56 (see FIG. 1).

With the carrier strapped to the duffelbag as shown in FIG. 1 and as described above, and bearing in mind that the duffelbag itself is usually so tightly packed as to be at least semirigid, it will be seen that the bag can be rolled along a floor 58 on wheels 18 in the manner of a two-wheeled cart, the bag itself serving as the body of the cart. The user can grasp either handle 6 or shoulder strap 8 to support and propel the bag. Tongue 28 does not serve primarily as a weight-supporting member, but as a stabilizer to defeat any tendency of beam 14 to "roll" relative to the bag about its own axis, which would of course render the carrier inoperable either by allowing wheels 18 to contact and rub against the bag, or by allowing the bag to drop into engagement with the floor. For this purpose, the tongue may be quite short as shown, so long as the duffelbag is firmly packed. Strap 50 thus not only defeats any tendency of beam 14 to roll about its axis, but also maintains tongue 28 extended at right angles from the beam. Straps 40 and 42 secure the bag firmly to beam 14. Also, since straps 40 and 42 are secured adjacent the ends of the beam, they prevent said beam from "yawing" relative to the bag, about the axis of the tongue, or perhaps a more accurate statement would be that they prevent the bag from shifting laterally of itself along the beam. Also, it will be seen that the bag may be tilted to rest on its lower end on floor 58, free of wheels 18, whenever desired.

When buckles 48 and 56 are released to dismount the carrier from the duffelbag, tongue 28 may be pivoted on bolt 30 to lie directly beneath beam 14, as shown in FIG. 4, and the straps wrapped about the beam and tongue. Although the carrier is quite small even when the tongue is extended for use, this folding provides a still further reduction in size for still greater convenience of carrying and storing the carrier. When so folded the carrier is less than a foot long if constructed for ordinary duffelbags, and may conveniently be stored inside the duffelbag itself, or even carried in a pocket.

Figure 7:
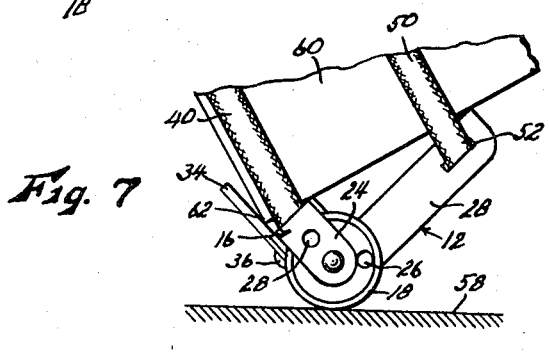

While the carrier has been designed primarily for use with duffelbags, it is also adapted for use with boxes, crates and the like. FIG. 7 shows the carrier mounted on a box 60, the latter being shown fragmentarily. The mounting and usage of the carrier in connection with boxes, crates or other rigid structures is the same as with duffelbags, except that backstop bars 34 are then preferably pivoted upwardly to project above beam 14 as shown in FIG. 7 and in dotted lines in FIG. 4. They thus constitute backstops engaging the lower rearward edge 62 of the box, as shown in FIG. 7, to prevent the box from working gradually rearwardly through straps 40, 42 and 50, which would displace wheels 18 relative to the box. The straps could of course be made sufficiently tight to prevent such displacement, but this operation could be difficult if performed manually, and the backstops provide an easy, convenient solution. The use of the backstops is generally unnecessary when applying the carrier to a duffelbag, since the bag surface is somewhat yieldable, and can be indented by the straps sufficiently to hold the carrier firmly in position. Box 60 may be provided with a handle, not shown, or an additional strap, not shown, could be trained thereabout in spaced-apart relation from straps 40 and 50 to serve the same function as handle 6 or shoulder strap 8 of the duffelbag.

While I have shown and described a specific embodiment of my invention, it will be readily apparent that many minor changes of structure and operation could be made without departing from the spirit of the invention as defined by the scope of the appended claims.

I claim:

1. A duffelbag carrier comprising:
   a. a straight rigid beam;
   b. a pair of floor-engaging wheels carried by said beam respectively at opposite ends thereof about axes parallel thereto;
   c. means for attaching said beam to a duffelbag with said wheels spaced apart from said bag, said attaching means including a rigid tongue pivoted at one end to said beam on an axis transverse to both of said members, whereby said tongue may be pivoted from a position extending transversely from said beam, intermediate the ends of the latter to a position parallel with and against said beam, for convenience of storage; and
   d. means for attaching the extended end of said tongue to said duffelbag.

2. A duffelbag carrier as recited in claim 1 wherein said attaching means additionally comprises:
   a. a pair of pliable straps each having one end affixed to said beam, respectively adjacent opposite ends thereof, and adapted to be extended oppositely about a duffelbag; and
   b. means for securing the extended ends of said strap together and wherein said means for attaching said tongue to said bag comprises an additional strap attached intermediate its ends to said tongue adjacent the free end of the latter, and adapted to be passed around a duffelbag, and means for securing the free ends of said additional strap together.

3. A duffelbag carrier as recited in claim 2 with the addition of one or more backstop bars pivoted to said beam intermediate the ends of the latter at the side thereof opposite to that from which said tongue extends when in its use position, whereby to be movable from a folded position coincident with said beam to a use position extending laterally to both said beam and said tongue.